POLYMERIC POLYETHYLENE NUCLEATING AGENTS

Naoichi Takashima, Hajima-gun, Gifu-ken, and Toshihiko Kuroda, Shigeru Tanba, and Yuziro Nakayama, Yokkaichi-shi, Mie-ken, Japan, assignors to Mitsubishi Petrochemical Company Limited, Chiyoda-ku, Tokyo, Japan, a corporation of Japan
No Drawing. Filed Jan. 15, 1964, Ser. No. 337,734
Claims priority, application Japan, Jan. 19, 1963, 38/1,524
6 Claims. (Cl. 260—897)

This invention relates to a composition containing polyethylene, the shaped articles from which have excellent characteristics of transparency, gloss and homogeneity.

Shaped articles of polyethylene, such as film, and sheet, are usually opaque or misted, and sometimes lose their gloss. In order to improve over the said disadvantages and to produce transparent and glossy shaped articles, many researches are reported. However, there has not been obtained a satisfactory product.

In order to improve over the said disadvantages, this invention provides for a composition of a branched chain polyethylene mixed with up to 10% by weight of a modifier.

The modifier of the invention is defined as a compound consisting of polyolefine or paraffin containing phosphorus in an amount of 0.1% or more chemically bonded to the polyolefine or paraffin.

The polyolefines are the products prepared by polymerising or copolymerising olefines having the general formula:

$$CH_2=CR_1R_2$$

wherein $R_1$ and $R_2$ are hydrogen, alkyl group or aryl group, and are preferably crystalline or partially crystalline. The paraffin contains 16 or more carbon atoms and may be mixtures thereof.

The introduction of phosphorus derivatives into the polyolefins or paraffin is attained, for example, by the reaction of polyolefine or paraffin being dissolved or suspended in phosphorus trichloride with oxygen or by the reaction thereof with phosphorus trichloride and oxygen using aliphatic or aromatic hydrocarbons as a solvent or suspending agent. The thus modified polyolefines or paraffins are preferably then treated with alcohol, phenol or the derivatives thereof, or water below the room temperature. The introduction of the phosphorus may also be carried out similarly using phosphorus pentachloride, etc.

As the modifiers, for example, there are isotactic polypropylene containing 1.2% of chemically bonded phosphorus, high density polyethylene having a specific weight of 0.95 and containing 2.0% of the chemically bonded phosphorus, and highly atactic polypropylene containing 2.0% of chemically bonded phosphorus.

Up to 10% and, preferably 0.5–5% of the modifier may be incorporated into the branched chain polyethylene to extraordinarily improve the transparency, gloss, and uniformity of the polyethylene.

It is well known that the transparency, gloss, and uniformity of branched chain polyethylene are generally improved to some extent by destroying or refining the irregular structures formed during the polymerisation steps.

The transparency and gloss of the shaped articles of polyethylene are phenomena caused with surface structure and the inner structure of the shaped articles. In case of film, it depends predominantly upon the surface structure and in case of sheets or shaped articles, it seems too it depends predominantly on the inner structure. It is believed that the microscopical roughness of the surface of the shaped articles and the non-uniformity of the inner structure are the causes of the opacity or haze and the reduction of gloss and further upon the spherulite structure of the shaped articles, especially their average size.

It is widely known that the average size of the spherulite may be regulated by incorporating certain additives to act as latent nuclei. From that point of view, there is much research concerned with additives as a latent nucleus forming agents to control the size of the spherulite. For example, branched chain polyethylene is blended with polypropylene or high density polyethylene which act as a latent nucleus, whereby some improvement is obtained in the transparency and gloss, etc. However, the improvement from the incorporation of polypropylene or high density polyethylene is not satisfactory.

In order to achieve an extraordinary improvement, we have found that polyolefines and paraffin when treated chemically to introduce phosphorus derivatives, produce a modifier which greatly increases the transparency, gloss and uniformity when incorporated in the branched chain polyethylene. The dissolution and behavior of the phosphorus modified polyolefine or paraffin in the branched chain polyethylene is extremely superior to that of conventional polyolefine or paraffin. One of the reasons for that is the introduction of phosphorus derivatives into polyolefine or paraffin extraordinarily improve their microscopically uniform dispersibility into the branched chain polyethylene. It is apparent from the fact that the incorporation of the polypropylene or high density polyethylene, in which the phosphorus derivatives are not introduced, forms non-uniform spots, and that the branched chain polyethylene blended with the phosphorus modified polyolefine or paraffin can be moulded uniformly even at low temperature.

For other reasons, the introduction of the phosphorus derivatives greatly accelerates the crystallization of the modifier itself. This is apparent from the fact that the incorporation of a so modified branched chain polyethylene, of a density of 0.992, into the same conventional polyethylene improves the transparency and gloss. Of course the transparency and the gloss are not improved when the phosphorus derivatives are not introduced.

As stated above, the modifier defined above is incorporated into the branched chain polyethylene to act as a uniformly dispersed latent nucleus to get fine and uniform spherulites, whereby the transparency of the shaped articles is improved and an extremely smooth surface and gloss of the film is obtained.

However, without regard to the specified theory stated above, this invention provides a composition, the transparency, gloss and uniformity of the shaped articles thereof are greatly extremely improved. The theoretical explanation stated above is not settled. The substance of the invention is naturally not dependent on the theory.

The modifier may be incorporated with any suitable method, by which the distillation is achieved. The mixing may be carried out with an extruder, heated roll and a Banbury mixer as usual. Two or more modifiers may be used simultaneously, and the modifier may be used with the other additives. The variation of the density and the crystallization by the addition of the modifier is extremely small having little effect upon the mechanical strength.

The invention will be illustrated with the following examples, but it should be understood that the invention is not limited to the examples.

Example 1

The modifier of the invention is prepared as follows: To a vessel of a capacity of 1 l., 500 cc. of carbon tetrachloride is charged, and 60 g. of isotactic polypropylene of a melt index of 2.0 is added. The mixture is heated at 70° C. to which is added 52 cc. of phosphorus trichloride while in the suspended state.

Into the mixture, oxygen is passed at a rate of 10 l./hr. for 4 hrs. and then ethyl alcohol is added to precipitate the reaction product.

The precipitated reaction product is purified with a xylene-methyl alcohol system. From the analysis, the content of phosphorus is 1.2%.

*Example 2*

Powdery branched chain polyethylene of a melt index of 4.0 and a density of 0.923 is mixed with 2.0%, based on the said polyethylene of the modified isotactic polypropylene prepared in Example 1 containing 1.2% of phosphorus prepared in Example 1. The resultant composition is mixed with an extruder provided with a lot die at a die temperature of 160° C. and the extruded product is moulded into pellets with a pelletizer.

The pellets are molded into a sheet 0.5 mm. thick with a press moulding machine at 130° C. and then tested.

Further, the results of the test with sheets produced in the same manner stated above from the branched chain polyethylene without the modifier and from the branched chain polyethylene blended with the same isotactic polypropylene, in which the phosphorus derivative is not introduced, are compared in the Table 1.

TABLE 1

| Additive | Haze (percent) | Density (g./cm.³) | Tensile strength (kg./cm.²) | Elongation at break (percent) |
| --- | --- | --- | --- | --- |
| 1. Isotactic polypropylene containing 1.2% P (2.0%) | 15.0 | 0.924 | 125 | 505 |
| 2. Isotactic polypropylene free from P derivative (2.0%) | 45.0 | 0.923 | 113 | 25 |
| 3. None | 53.0 | 0.923 | 123 | 510 |

*Reference.*—Haze is measured with a method of ASTM D 1003–59, and density is measured with a density gradient pipe method using isopropyl alcohol-water mixed solvent at 20° C. The same methods are used in the following examples.

The measurement of tensile strength and elongation at break point is carried out with a Shopper type tensile testing machine at 20° C. The tensile rate is 100 mm./min.

In case of the blend with the additive free from the phosphorus, the lower value of the elongation at the break point seems to indicate that it is not uniformly mixed with the polyethylene.

*Example 3*

Isotactic polypropylene of a melt index of 1.0 and atactic polypropylene of a molecular weight of about 50,000 and a degree of crystallization of about 10% are treated with phosphorus trichloride in the same manner as in Example 1, precipitated with phenol and then purified similarly to prepare isotactic polypropylene containing 1.5% of phosphorus and highly atactic polypropylene containing 2.0% of phosphorus, respectively.

These modifiers are then mixed with branched chain polyethylene powder of a melt index of 4.0 and a density of 0.923 in an amount of 1.0% based on the polyethylene respectively, charged into an extruder as in Example 2 and moulded into a sheet 0.5 mm. thick with a press moulding machine at 120° C. and then tested.

Further sheets 0.5 mm. thick are produced similarly from the polyethylene mixed with the same conventional isotactic polypropylene or atactic polypropylene, in which the phosphorus derivative is not introduced, in an amount of 1.0% respectively and from polyethylene free from the additive. The testing results are shown in the Table 2 for comparison.

TABLE 2

| Additive | Haze (percent) | Density (g./cm.³) |
| --- | --- | --- |
| 1. Isotactic polypropylene containing 1.5% of P (1.0%) | 12.0 | 0.924 |
| 2. Atactic polypropylene containing 2.0% of P (1.0%) | 15.2 | 0.923 |
| 3. Isotactic polypropylene containing no P derivative (1.0%) | (¹) | (¹) |
| 4. Atactic polypropylene containing no P derivative (1.0%) | 45.0 | 0.923 |
| 5. None | 51.0 | 0.923 |

¹ Impossible to mold uniform sheet.

*Example 4*

Branched chain polyethylene pellet of a melt index of 2 and of a density of 0.924 is mixed with a modifier of isotactic polypropylene containing 1.5% of phosphorus prepared in Example 3 in an amount of 3% by weight based on the polyethylene with a heated roll at 180° C. for 8 min., and then molded to a sheet 0.5 mm. thick with a press molding machine at 130° C. and tested. The haze is 17.0%.

When the same isotactic polypropylene in which phosphorus derivative is not introduced, is used in place of the phosphorus containing isotactic polypropylene, the haze is 30.0%.

*Example 5*

High density polyethylene of a melt index of 0.3 and a density of 0.95 is treated with phosphorus trichloride as in Example 1, precipitated with phenol and then purified similarly to prepare a modifier consisting of high density polyethylene containing 2.0% of phosphorus.

The modifier is then mixed with branched chain polyethylene powder of a melt index of 4.0 and of a density of 0.923 in an amount of 1.0% by weight based on the branched chain polyethylene, charged into an extruder as in Example 2 and molded to a sheet 0.5 mm. thick with a press molding machine at 120° C. and tested. The haze is 25.0%.

When the same high density polyethylene in which phosphorus derivative is not introduced is used in place of the phosphorus containing polyethylene, the haze is 45.0%.

*Example 6*

Branched chain polyethylene of a melt index of 4 and of a density of 0.922 is treated as in Example 1 to prepare a modifier consisting of branched chain polyethylene containing 2.1% of phosphorus.

The same branched chain polyethylene of a melt index of 4 and of a density of 0.922 as used in preparing the said modifier is mixed with the modifier at an amount of 3.0% by weight based on the polyethylene, charged into an extruder, as in Example 2, and molded to a sheet 0.5 mm. thick with a press molding machine at 130° C. and tested. The haze is 40.0%.

On the other hand, the haze without the modifier is 54.0%.

Example 7

Paraffin wax of an average molecular weight of about 600 is treated with phosphorus trichoride as in Example 1, precipitated with ethyl alcohol and refined similarly to prepare a modifier of paraffin wax containing 1.0% of phosphorus.

The said modifier is mixed with powdery branched chain polyethylene of a melt index of 4.0 and a density of 0.923 at an amount of 2.0% by weight based on the polyethylene, charged into an extruder as in Example 2, and molded to a sheet 0.5 mm. thick with a press molding machine at 120° C. and tested. The haze is 36.0%.

When the same paraffin wax in which phosphorus derivative is not introduced is used in place of the phosphorus containing paraffin, the haze is 48.0%.

As stated above, the branched chain polyethylene may be incorporated with the modifier defined above to act as a uniformly dispersed latent nucleus whereby fine and uniform spherulites are obtained. Thus, the transparency of the shaped articles is improved and a product having good surface and excellent gloss is obtained.

What we claim is:

1. A composition consisting of solid branched chain polyethylene and less than 10% of a modified hydrocarbon selected from the group consisting of solid polyethylene, polypropylene and paraffin wax chemically bonded with from 0.1 to 2.1% phosphorus wherein said chemical bonding is effected by reacting said hydrocarbon with phosphorus trichloride and oxygen.

2. A composition as in claim 1, wherein the polypropylene is isotactic polypropylene.

3. A composition as in claim 1, wherein the polypropylene is the mixture of isotactic polypropylene and atactic polypropylene.

4. A composition as in claim 1, wherein the modified polyethylene is high density polyethylene.

5. A composition as in claim 1, wherein the modified polyethylene is low density polyethylene.

6. The process of improving the transparency of branched chain polyethylene comprising reacting a hydrocarbon selected from the group consisting of solid polyethylene, polypropylene and paraffin wax with phosphorus trichloride and oxygen to produce a phosphorated hydrocarbon having from .1 to 2.1% phosphorus by weight in said hydrocarbon and mixing less than 10% by weight of said phosphorated hydrocarbon with a branched chain polyethylene.

References Cited

UNITED STATES PATENTS

| | | | |
|---|---|---|---|
| 3,008,939 | 11/1961 | Schroeder et al. | 260—94.9 |
| 3,058,941 | 10/1962 | Birum | 260—30.6 |
| 3,228,896 | 1/1966 | Canterino et al. | 260—30.6 |
| 3,254,139 | 5/1966 | Anderson et al. | 260—897 |
| 3,255,276 | 6/1966 | Winter et al. | 260—897 |
| 3,265,771 | 8/1966 | Ray et al. | 260—897 |
| 3,125,462 | 3/1964 | Rachinsky | 260—897 |
| 3,226,454 | 12/1965 | Marans et al. | 260—897 |

FOREIGN PATENTS 677,933    1/1964    Canada.

OTHER REFERENCES

Kuhre et al.: SPE Journal, pp. 1113–1119 (October 1964). Copy in Group 140. Last, J. Poly. Sci., vol. 39, pp. 543–545 (1959).

GEORGE F. LESMES, *Primary Examiner.*

MURRAY TILLMAN, *Examiner.*

T. G. FIELD, JR., *Assistant Examiner.*